(12) United States Patent
Holm

(10) Patent No.: US 7,362,656 B2
(45) Date of Patent: Apr. 22, 2008

(54) ULTRASONIC LOCATING SYSTEM

(75) Inventor: Sverre Holm, Asker (NO)

(73) Assignee: Sonitor Technologies AS, Oslo (NO)

( * ) Notice: Subject to any disclaimer, the term of this patent is extended or adjusted under 35 U.S.C. 154(b) by 312 days.

(21) Appl. No.: 10/534,485

(22) PCT Filed: Dec. 2, 2003

(86) PCT No.: PCT/NO03/00403

§ 371 (c)(1),
(2), (4) Date: May 11, 2005

(87) PCT Pub. No.: WO2004/051303

PCT Pub. Date: Jun. 17, 2004

(65) Prior Publication Data

US 2006/0077759 A1    Apr. 13, 2006

(30) Foreign Application Priority Data

Dec. 4, 2002    (NO) .................................. 20025833

(51) Int. Cl.
G01S 3/808    (2006.01)
G01S 5/30    (2006.01)
G01S 11/14    (2006.01)

(52) U.S. Cl. ..................................................... 367/128

(58) Field of Classification Search ................ 367/128, 367/127

See application file for complete search history.

(56) References Cited

U.S. PATENT DOCUMENTS

| | | |
|---|---|---|
| 4,822,990 A | 4/1989 | Tamada |
| 5,051,741 A | 9/1991 | Wesby |
| 5,119,104 A | 6/1992 | Heller |
| 5,245,317 A | 9/1993 | Chidley |
| 5,418,758 A | 5/1995 | Webster |
| 5,528,232 A | 6/1996 | Verma et al. |
| 5,920,287 A | 7/1999 | Belcher |
| RE36,791 E | 7/2000 | Heller |
| 6,121,926 A | 9/2000 | Belcher |
| 6,141,293 A | 10/2000 | Amorai-Moriya |

(Continued)

FOREIGN PATENT DOCUMENTS

GB    2265038    9/1993

(Continued)

OTHER PUBLICATIONS

P. Flikkema, "Spread-spectrum techniques for wireless communication," IEEE Signal Proc. Mag., May 1997.

(Continued)

*Primary Examiner*—Dan Pihulic
(74) *Attorney, Agent, or Firm*—O'Shea, Getz & Kosakowski, P.C.

(57) ABSTRACT

The invention relates to a method and a system for monitoring and position determination of objects and/or living beings within an area, such as, e.g. a room in a building or a road tunnel. The system comprises a plurality of identification tags equipped with an ultrasonic receiver and radio transmitter which is attached to the objects that have to be monitored. The identification tags receive ultrasonic signals whose arrival time they measure. This information together with the identification tags' ID code are transmitted by radio waves to a central unit which calculates the position of each of the identification tags.

28 Claims, 3 Drawing Sheets

U.S. PATENT DOCUMENTS

Figure 1:
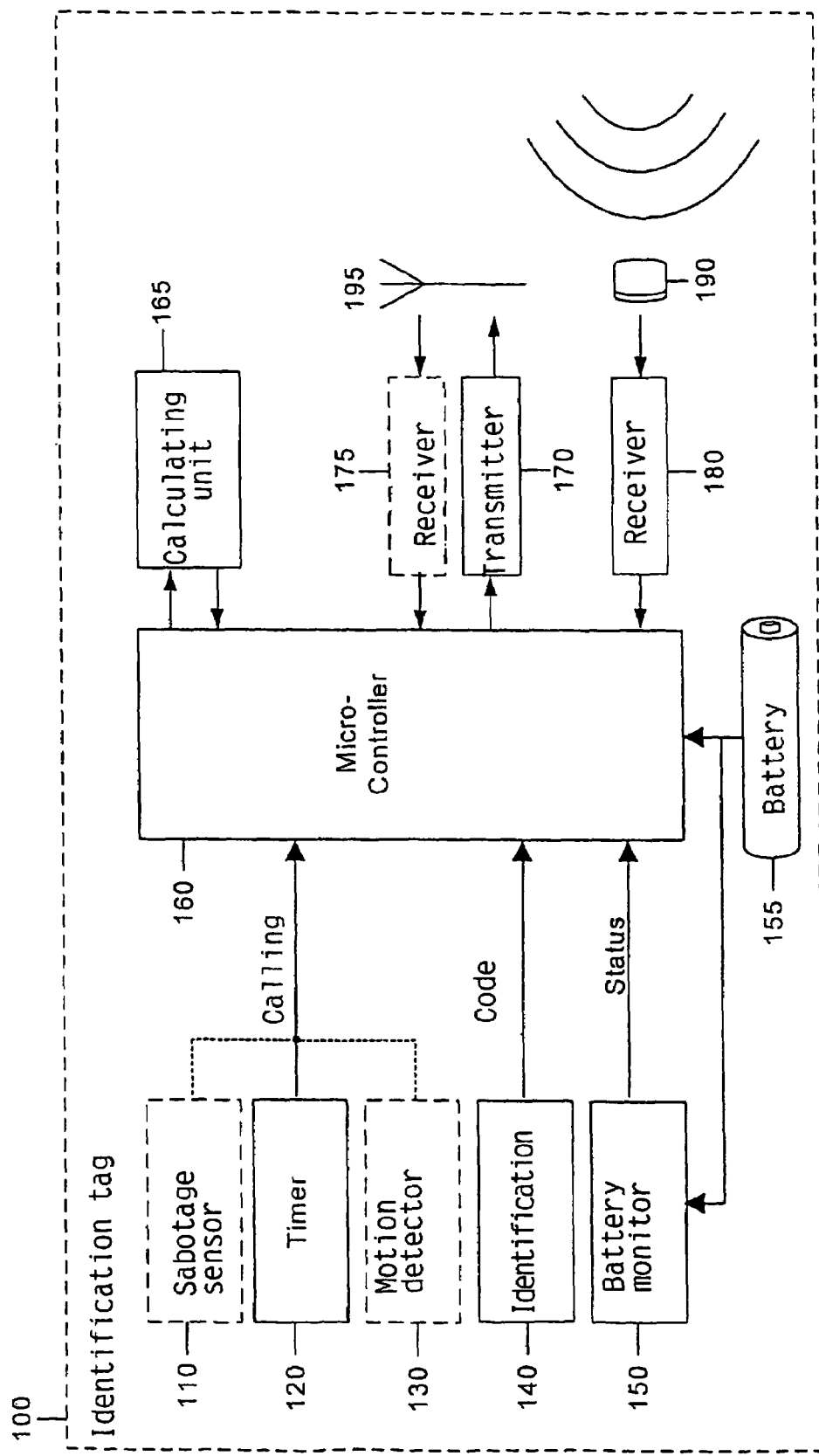

| | | | |
|---|---|---|---|
| 6,317,386 B1 | 11/2001 | Ward | |
| 6,433,689 B1 | 8/2002 | Hovind | |
| 6,678,209 B1 | 1/2004 | Peng et al. | |
| 6,710,719 B1 | 3/2004 | Jones et al. | |
| 6,724,688 B2 | 4/2004 | Betts et al. | |
| 2005/0232081 A1* | 10/2005 | Holm | 367/118 |
| 2006/0013070 A1* | 1/2006 | Holm et al. | 367/128 |
| 2006/0077759 A1* | 4/2006 | Holm | 367/128 |

FOREIGN PATENT DOCUMENTS

| | | |
|---|---|---|
| GB | 2298098 | 8/1996 |
| WO | WO 99/28761 | 6/1999 |
| WO | WO 02/04975 | 1/2002 |
| WO | WO 03/087871 | 10/2003 |

OTHER PUBLICATIONS

Freitag et al. "Analysis of channel effects on direct-sequence and frequency-hopped spread-spectrum acoustic communication," IEEE Journ. Ocean. Eng., Oct. 2001.

N. M. Vallidis "Whisper: A Spread Spectrum Approach to Occlusion in Acoustic Tracking", University of North Carolina at Chapel Hill, Department of Computer Science, 2002.

R. Palmer, "A spread spectrum acoustic ranging system—An overview," Proc. 2002 IEEE Canadian Conference on Electrical & Computer Engineering, May 2002.

* cited by examiner

ULTRASONIC LOCATING SYSTEM

INTRODUCTION/TECHNICAL FIELD

The invention relates to a method and a system for monitoring and position determination of objects and/or living beings within an area such as, e.g. a room in a building or a road tunnel. The system comprises a plurality of electronic units called identification tags, which are attached to the objects to be monitored. Each identification tag has its own identification code (ID code) and is equipped with an ultrasonic receiver and radio transmitter. The ultrasonic signals it receives are transmitted synchronously from a plurality of transmitter units. The ultrasonic receiver in the identification tag is connected with a calculating unit which calculates the arrival time of received ultrasonic signals. This information together with the identification tag's ID code and any additional information are transmitted in the form of radio waves to a central processing unit which calculates the identification tag's position and presents it to a user of the system.

BACKGROUND TO THE INVENTION

There are a number of different positioning systems in existence today based on various principles including ultrasound and radio waves. These systems all have both advantages and disadvantages. The system according to the invention employs identification tags which are placed on the objects that have to be monitored. The identification tags contain both ultrasonic receivers and radio transmitters.

Systems based on radio waves, for example in one of the unlicensed ISM bands (Industrial, Scientific, Medical), for example 2.4 GHz for WLAN or Bluetooth™ plug-in wireless network card in PCs have the following advantages: they have a high data transfer capacity, they can tolerate a lot of movement (Doppler shift) and have a long range. The disadvantages of such a system are that the long range makes it necessary to use 3 or more base stations in order to obtain a position.

Location systems based on ultrasound have the following advantages: they have a short range, the waves do not pass through walls, i.e. they are easy to position at room level and the detectors are cheap. The disadvantages are that these systems have a low transfer capacity and cannot tolerate much movement.

The invention outlined herein combines the best features of radio and ultrasound-based systems. An identification tag according to the invention is equipped with both an ultrasonic receiver and a radio transmitter. The ultrasonic signals it receives are transmitted synchronously from a plurality of transmitter units. The ultrasonic receiver in the identification tag is connected with a calculating unit which calculates the arrival time of received ultrasonic signals. This information together with the identification tag's ID code etc. are transmitted in the form of radio waves to a central processing unit which calculates the identification tag's position and presents it to a user of the system.

By equipping an identification tag with a radio receiver in addition to a radio transmitter, the ultrasonic receiver in the identification tag can be activated only if ultrasonic signals are to be transmitted in the room or the area in which it is located.

The system may advantageously be employed in areas which are traditionally used for only radio-based systems or only ultrasound-based systems. By using ultrasound for calling up a single or several tags, the area in which tags respond will be restricted, while the use of radio waves for transferring the ID code and timing gives the identification tag a high data transfer capacity and makes it insensitive to Doppler shift.

PRIOR ART

Several different principles exist today for locating objects within a limited area. The systems are generally based on ultrasonic and/or radio communication. U.S. Pat. No. 6,317,386 describes a system which combines ultrasonic and radio waves. The system works in such a manner that the identification tags are called up by means of radio waves, while the actual communication between transmitter units and base stations is conducted by means of ultrasound. The object of this system, which is for indoor use, is to increase the capacity of an ultrasound-based system. This is accomplished by periodically calling up each tag, which has a unique address, by means of radio waves. The identification of each tag therefore does not need to be transmitted to the base station by means of ultrasound. The area of application of this system is restricted, the system requires accurate location of all the receivers in advance and complicated signal processing, and it functions best when there is an unobstructed view between the transmitter and the receivers.

The present invention is also a system which combines ultrasonic and radio waves. However, unlike U.S. Pat. No. 6,317,386 the identification tags receive ultrasonic pulses, and the actual communication from the identification tags to a central unit is implemented by means of radio waves. By using such a system a wider area of application is achieved than with the system described in U.S. Pat. No. 6,317,386.

U.S. Pat. No. 6,121,926 also describes a system for location of identification tags. In this case the tags are attached to objects in a logistics system. When an identification tag transmits a signal with its identification, it has to be received on 3 or more base stations, where an analysis is made of the arrival time and the position is determined. In practice, the accuracy of such a system will be a few metres, thus making it difficult to determine which room an object is located in without extensive calibration. Moreover, the cost per base station with antenna for the radio is substantially greater than the cost of the ultrasonic transmitters, even though one ultrasonic transducer often has to be placed in each room. U.S. Pat. No. 612,196 essentially describes an improved signal processing method for improving the location of identification tags by distinguishing between direct waves and reflected waves. This requires processing power which is also not required in the present invention.

BRIEF DESCRIPTION OF THE INVENTION

The present invention relates to a method and a system for monitoring and position determination of identification tags which can be attached to objects. The object of the invention is to provide a flexible system that combines the use of ultrasonic waves and radio waves. The system and the method according to the invention make it possible to achieve high data transfer capacity and to measure position regardless of movement.

The system comprises, more closely described, electronic transmitter units or identification tags for attaching to the objects that have to be monitored. Each identification tag is equipped with a radio transmitter and ultrasonic receiver. Furthermore, each room is equipped with one or more units which transmit different encoded ultrasonic pulses. The transmission of ultrasonic pulses from these stationary units is controlled from a central processing unit which may be a server with which the system is in network connection.

The stationary units in the system consist of master units and slave units. A master unit comprises an ultrasonic transmitter and means for transmitting and receiving synchronisation information. The master units may receive synchronisation signals from a central processing unit, e.g. a server. Moreover, they may transmit this synchronisation information to the slave units which are stationary units comprising ultrasonic transmitters and means for receiving the synchronisation information. The connection between master units and slave units is either wireless or wire-based. For a wireless connection the use of radio waves is preferred. The connection between master units and server may also be wireless or wire-based, where the use of radio waves is preferred.

In the simplest embodiment there may be only one stationary master unit in each room or area, where each master unit receives control signals from the central processing unit. The master unit will then transmit an ultrasonic pulse in the room in which it is located. In such a system it will only be possible to perform a rough positioning, i.e. whether or not there is an identification tag in a room.

In a preferred embodiment there is one stationary master unit in each room or area that is connected with a central processing unit, e.g. a server, and at least three slave units connected with the master unit. When a user of the system wishes an update of the position of the various identification tags, this starts by the user of the system implementing an initiation from a server or terminal connected to the server. The server successively transmits a message to the master units in each room with which it is connected. In the first room, e.g. room 1, the master unit will transmit a synchronisation message to slave units with which it is connected. The master unit and the slave units will simultaneously transmit an ultrasonic pulse, each encoded in its own way, which is received by the identification tags in room 1. Each identification tag will calculate arrival times for received ultrasonic pulses. This information together with the identification tag's ID code is transmitted in the form of radio signals to the server which in turn updates its database with the position of the various identification tags and thereby the object to which they are attached. After the positions of the identification tags in room 1 have been updated, room 2 will be called up, and the same procedure will be carried out until all the rooms included in the system have been examined.

In a power-saving embodiment the identification tags may be equipped with a radio receiver, thus enabling them to intercept the radio waves transmitted from the server to the master unit in the room in which they are located and thereby switch on the ultrasonic receiver for a certain period after receiving the radio waves.

The object of the invention is achieved with a system and a method as described in the set of claims, and which will be described in greater detail below.

LIST OF DRAWINGS

Figure 2:
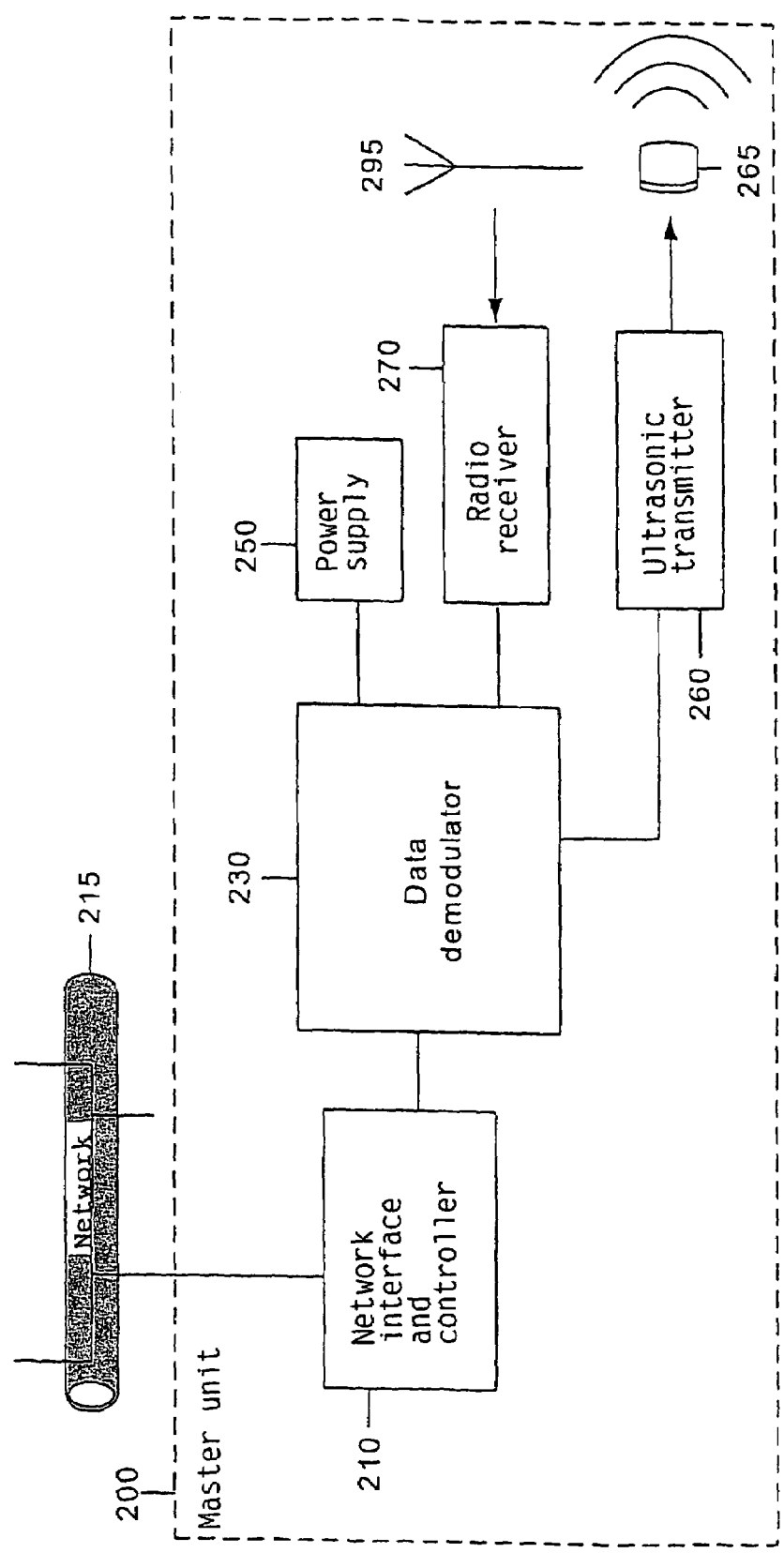
Figure 3:
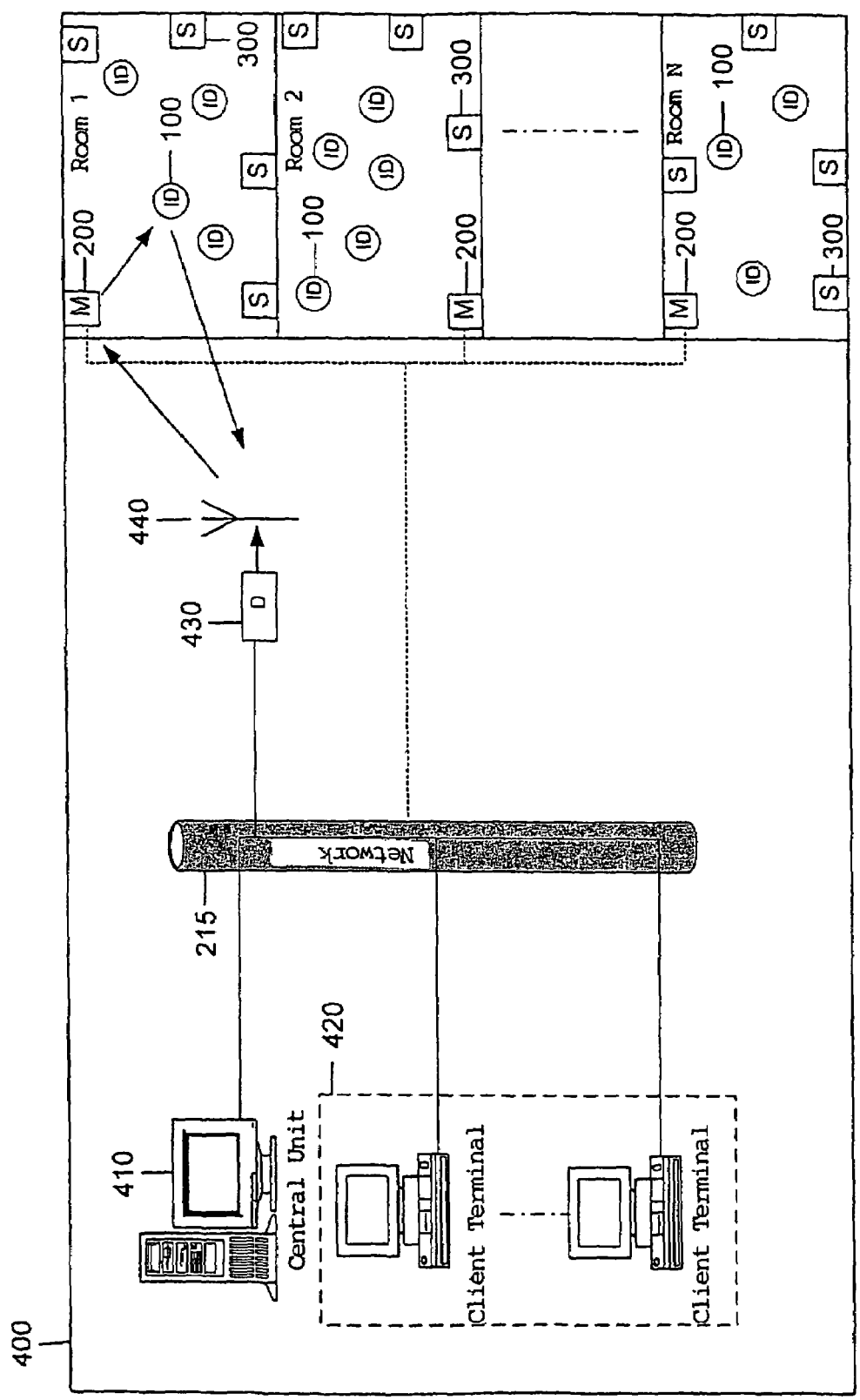

The invention will be further described with reference to the drawings, in which:

FIG. 1 illustrates the construction of an identification tag for this system, FIG. 2 illustrates the construction of a master unit, and FIG. 3 illustrates how the whole system is combined in a network.

DETAILED DESCRIPTION

The system according to the invention is constructed in such a manner as to obtain high data transfer capacity and insensitivity to Doppler shift. There are several technical features with regard to transmitter, receiver and central unit that contribute to this. As a whole it represents a system that is well suited to different environments. The advantages of the invention are achieved by combining the use of radio waves with ultrasonic waves in the manner described below.

FIG. 1 illustrates which units may typically be incorporated in each identification tag 100. The identification tag 100, which is intended for use in a location system 400 (FIG. 3) for determining the identification tag's 100 location in a room in a building or areas that require to be monitored, comprises an ultrasonic transducer 190 adapted to receive ultrasonic signals, together with a radio transmitter 170 connected to an antenna 195 for transmitting signals with information containing the identity of the identification tag. The ultrasonic transducer 190 is connected to a receiver unit 180 for detecting ultrasonic pulses with different codes (e.g. frequencies, scattered spectrum, etc.) transmitted from one or more master units 200 and slave units 300 (FIG. 3) which transmit on the various frequencies. The identification tag 100 further comprises a calculating unit 165 connected to the receiver unit 180, arranged to calculate transit time differences for the received ultrasonic pulses. The calculating unit 165 is further connected to a control unit 160 which coordinates and controls all the signals received by and transmitted from the identification tag 100. The control unit 160 is arranged to cause the radio transmitter 170 to transmit the radio signals in response to the identification chip's 100 calculating unit 165 having calculated transit time differences for all received ultrasonic pulses.

The identification tag 100 may further consist of a sabotage sensor 110, which is connected to the control unit 160, in order to detect any attempt to remove and/or open the identification tag 100, and where, after such detection, the control unit 160 is adapted to add such additional information to the radio signal transmitted from the identification tag 100. Furthermore, the identification tag 100 may comprise a timer unit 120, motion detector 130, identification unit 140 and battery monitor 150, which monitors the status of the battery 155.

The identification tag 100 may also be equipped with a radio receiver 175 connected to an antenna 195. The radio receiver is then connected to the control unit 160 in order to receive the radio signals transmitted in the room or area in which it is located, with the result that the identification tag 100 does not need to listen continuously for ultrasonic signals. In this case the identification tag 100 will listen for ultrasonic pulses for a short period after receiving radio signals. Since the ultrasonic receiver requires more power than a radio receiver, this will represent a power saving.

The tag or identification tag 100 may contain all or only some of the units mentioned here.

FIG. 2 shows which units may typically be incorporated in a master unit 200. The master unit 200 comprises an ultrasonic transducer 265 for transmitting ultrasonic signals in the form of ultrasonic pulses and a receiver unit depicted as a radio receiver 270 for receiving instructions from at least one central processing unit 410. In the figure a radio receiver 270 is illustrated connected to an antenna 295. This type of connection to the central processing unit 410 may be replaced by a typical cabled connection such as, e.g. Ethernet. The signals coming into the receiver unit 270 via the antenna 295 are fed to a data demodulator 230 which in turn is connected to a network interface 215 via a controller 210.

To this network may be connected corresponding units, preferably slave units 300. The master units use the network to transmit synchronisation information to other connected units in the same room or area. The network connection may be wireless (not shown) or wire-based.

FIG. 3 shows an overview of the whole system 400 according to the invention. The figure illustrates the interplay between master units 200, slave units 300, identification tags 100 and a central unit 410 in the form of a server that processes all received data. Several client terminals 420 may also be coupled to the system in order to gain access to information from different locations.

A system 400 for position determination of at least one identification tag 100 comprising:

at least one stationary master unit 200, with an ultrasonic transducer 265 for transmitting ultrasonic signals in the form of ultrasonic pulses and a receiver unit 270 for receiving instructions from at least one central processing unit 410, at least one identification tag 100 as described above for transmitting the identification tag's 100 identification as well as measured transit time differences for received ultrasonic pulses together with any additional information, a network 215 interconnecting master units 200 with the central processing unit 410 for transfer of instructions, means in the central processing unit 410 for calling up identification tags 100 as well as detecting, collecting and interpreting received radio signals from the identification tags 100, and processing means in the central processing unit 410 for determining the position of the identification tags 100.

The system further comprises at least one stationary slave unit 300 with an ultrasonic transducer for transmitting ultrasonic signals in the form of ultrasonic pulses.

In a preferred embodiment the system comprises one master unit 200 and at least three slave units 300.

The network 215 further interconnects stationary master units 200 and slave units 300 for transfer of a synchronisation message from the master unit 200.

The stationary master units 200 and the slave units 300 each transmit ultrasonic waves on their own frequencies and with their own coding.

The master units 200 comprise means 210, 230 for transmitting a synchronisation message to all stationary slave units 300 with which they are connected via a network.

The connection between master units 200 and the central processing unit 410 may be based on radio waves or be wire-based.

The stationary slave units 300 comprise means for receiving a synchronisation message from stationary master unit 200 with which they are connected via a network. The network connection connecting stationary master units 200 and slave units 300 may be radio-based or wire-based.

The method for using the system according to the invention will now be described. In order to determine the position of one or more identification tags 100 in a room in a building or areas that require to be monitored, the method comprises:

a) transmitting a radio message concerning updating from a central processing unit 410 to stationary master units 200, b) transmitting a synchronisation message from the stationary master units 200 to stationary slave units 300, c) transmitting ultrasonic pulses synchronously from the stationary master units 200 and the slave units 300, d) receiving the ultrasonic pulses on the identification tags 100 described above, e) calculating transit time differences for received ultrasonic pulses in the identification tag 100, f) transmitting radio signals from the identification tag 100 containing transit time differences for received ultrasonic pulses together with identification of the identification tag 100 to a central processing unit 410, g) calculating the position of the specific identification tag 100 in the central processing unit 410 on the basis of received identification and transit time differences transmitted from the identification tag 100, together with knowledge of the position of each individual stationary master unit 200 and slave unit 300 in each room or area.

The synchronisation message transmitted from the master units 200 includes information concerning on which frequencies transmission should be made or which coding should be employed.

The stationary master units 200 and slave units 300 each transmit on their own code 1-n. The radio message from the central processing unit 410 to the stationary master units 200 is initiated by a user requesting an update of positions via a user interface on the central processing unit 410, or by an identification tag 100 transmitting a request via radio signals to the central processing unit 410.

Identification tags 100 containing a radio receiver 175 in addition to an ultrasonic receiver 180 will be able to switch on the ultrasonic receiver 180 only when master units and slave units are to transmit ultrasonic pulses in the area where they are called up by listening for radio signals transmitted from the stationary calculating unit 410 to the master units.

The identification tag 100 will transmit a request concerning updating of position together with additional information to the central processing unit 410 when any attempt is made to open or move it.

The invention claimed is:

1. An identification tag for use in a location system for determining the identification tag's location in a room in a building or areas to be monitored, wherein the identification tag comprises an ultrasonic transducer connected to a receiver adapted to receive ultrasonic signals, together with a radio transmitter connected to an antenna adapted to transmit an identity radio signals with information containing the identity of the identification tag, and wherein the tag further comprises a calculating unit connected to a control unit arranged to calculate transit time differences for the received ultrasonic pulses.

2. An identification tag according to claim 1, wherein the ultrasonic transducer is connected to the receiver unit in order to detect ultrasonic pulses with different frequencies or codes that are transmitted from one or more master units and slave units which transmit the different frequencies or codes.

3. An identification tag according to claim 1, characterised in that the receiver unit is connected to a control unit.

4. An identification tag according to claim 3, wherein the control unit is arranged to cause the radio transmitter to transmit a radio signals in response to the identification tag's calculating unit having calculated transit time differences for the received ultrasonic pulses.

5. An identification tag according to claim 4, further comprising a sabotage unit connected with the control unit for detecting any attempt to remove and/or open the identification tag, and where, after such detection, the control unit is adapted to add such additional information to a radio signal transmitted from the identification tag.

6. An identification tag according to claim 3, characterised in that it further comprises a radio receiver connected to the control unit for receiving information on which room or area it is located in, with the result that the identification tag does not need to listen continuously for ultrasonic signals.

7. A system for position determination of at least one identification tag, comprising:
- a central processing unit,
- at least one stationary master unit, with an ultrasonic transducer for transmitting ultrasonic signals in the form of ultrasonic pulses and a receiver unit for receiving instructions from the central processing unit,
- at least one identification tag according to claim 1 for transmitting the identification tag's identity, as well as measured transit time differences for received ultrasonic pulses, together with any additional information,
- a network interconnecting the at least one stationary master unit with the central processing unit for transfer of instructions,
- means in the central processing unit for calling up identification tags as well as detecting, collecting and interpreting received radio signals from the identification tags, and
- processing means in the central processing unit for determining the position of the identification tags.

8. A system according to claim 7, further comprising at least one stationary slave unit with an ultrasonic transducer for transmitting ultrasonic signals in the form of ultrasonic pulses.

9. A system according to claim 8, wherein the number of stationary master units is one, and the number of stationary slave units is at least three.

10. A system according to claim 8, wherein a network interconnects the stationary master unit and the stationary slave unit for transferring a synchronisation message from the master unit.

11. A system according to claim 8, wherein the stationary master unit and the stationary slave unit each transmits ultrasonic waves on its own frequency or with its own coding.

12. A system according to claim 7, wherein the stationary master unit comprises means for transmitting a synchronisation message to all stationary slave units with which it is connected.

13. A system according to claim 7, wherein characterised in that the network interconnecting the stationary master unit and the central processing unit is based on radio waves.

14. A system according to claim 7, wherein the network interconnecting the stationary master unit and the central processing unit is wire-based.

15. A system according to claim 7, wherein the stationary slave unit comprises means for receiving a synchronisation message from a stationary master unit with which it is in network connection.

16. A system according to claim 8, wherein the network interconnecting the stationary master unit and the stationary slave unit is radio-based.

17. A system according to claim 8, wherein the network interconnecting the stationary master unit and the stationary slave unit is wire-based.

18. A method for position determination of one or more identification tags in a room in a building or areas to be monitored, comprising the steps of:
a) transmitting a message from a central processing unit to at least one stationary master unit,
b) transmitting a synchronisation message from the stationary master unit to at least one stationary slave unit,
c) transmitting ultrasonic pulses synchronously from the stationary master unit and the stationary slave unit,
d) receiving the ultrasonic pulses at an identification tag,
e) calculating arrival times for received ultrasonic pulses in the identification tag,
f) transmitting radio signals containing information concerning arrival times for received ultrasonic pulses together with identification of the identification tag to a central processing unit,
g) calculating the position of the specific identification tag in the central processing unit on the basis of received identification and transit time differences transmitted from the identification tag, together with knowledge of the position of each individual stationary master unit and stationary slave unit in every room or area.

19. A method according to claim 18, wherein the synchronisation message contains information on which frequency or code has to be employed.

20. A method according to claim 18, comprising the step of the stationary master unit and stationary slave unit each transmitting on its own code.

21. A method according to claim 18, comprising the step of initiating the message from the central processing unit to the stationary master unit by a user requesting an update of positions via a user interface on the central processing unit.

22. A method according to claim 18, comprising the step of initiating the message from the central processing unit to the stationary master unit by an identification tag transmitting a request via signals to the central processing unit.

23. A method according to claim 18, wherein each identification tag that contains a radio receiver in addition to an ultrasonic receiver listens to radio signals transmitted from the central processing unit to the master unit and switches on its ultrasonic receiver only when it determines that the master unit and the slave unit are to transmit ultrasonic pulses in an area where the tag is located.

24. A method according to claim 18, wherein the identification tag transmits a request for initiation of a position determination update to the central processing unit when an attempt is made to open or move it.

25. An identification tag as in claim 1 wherein the radio transmitter is further arranged to transmit a transit time radio signal comprising information about one of said calculated transit time differences.

26. An identification tag as in claim 1 further comprising a radio receiver wherein the tag is arranged to listen for ultrasonic pulses only for a predetermined period after receiving a radio signal transmitted in the room or area in which it is located.

27. A method as in claim 18 wherein a master unit is located in each of a plurality of rooms and wherein the steps of the method are repeated for each one of said plurality of rooms in turn until the position of the tag is determined.

28. A central processing unit for use in a tag-position determination system arranged to receive ultrasound transit time difference information from a tag and to determine the tag's position therefrom.

* * * * *